July 11, 1933.  A. M. VEDOE ET AL  1,917,346
AUTOMATIC GAS CONTROLLER FOR OVENS
Filed Dec. 17, 1930   2 Sheets-Sheet 2
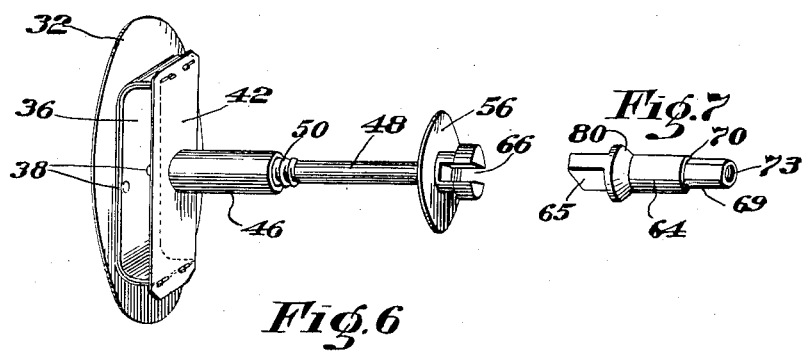
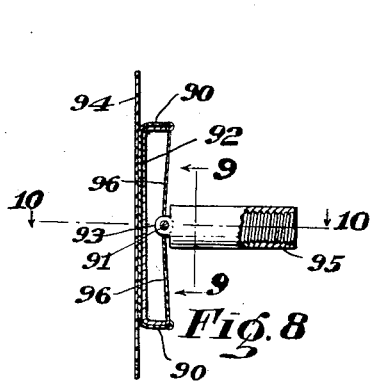
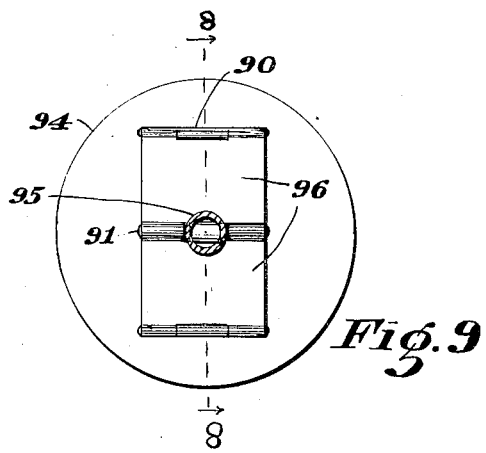
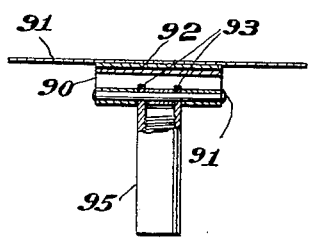
INVENTORS
ANTON M. VEDOE
CARL EIBYE
ATTORNEY Patented July 11, 1933

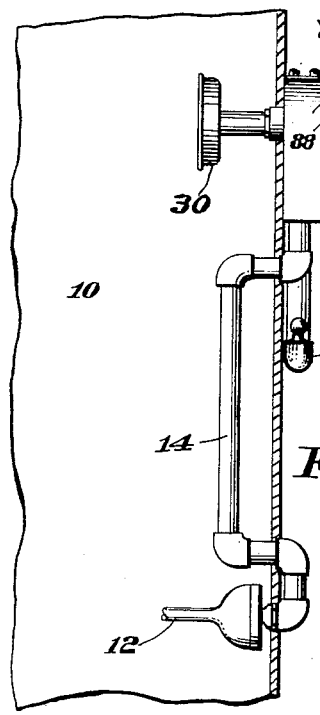
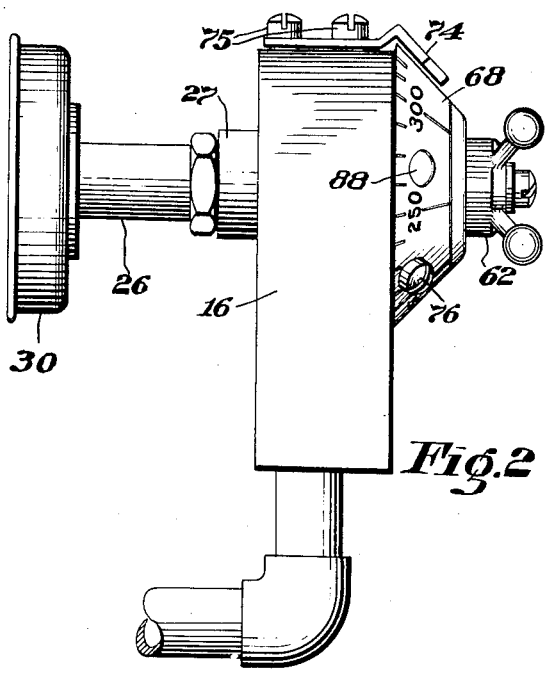
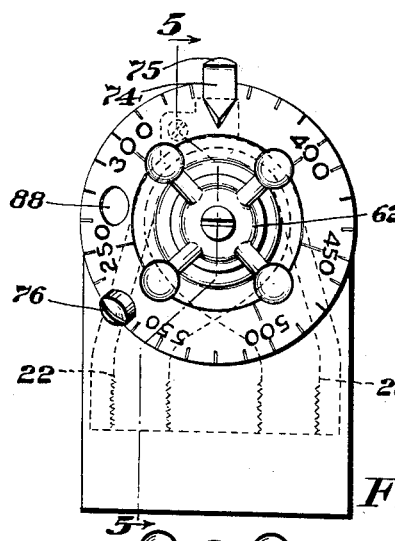
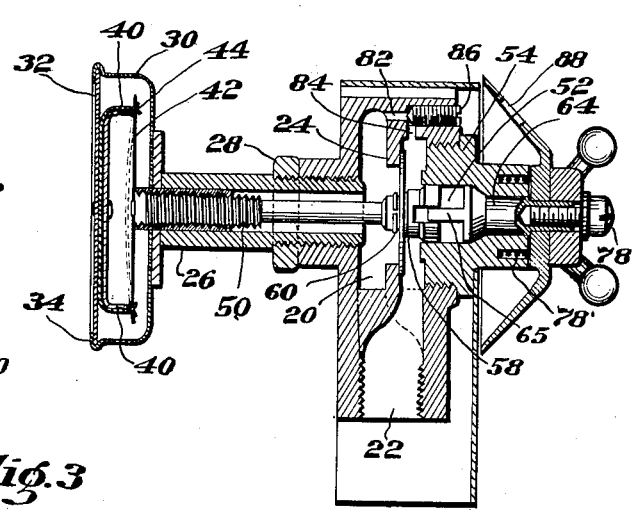
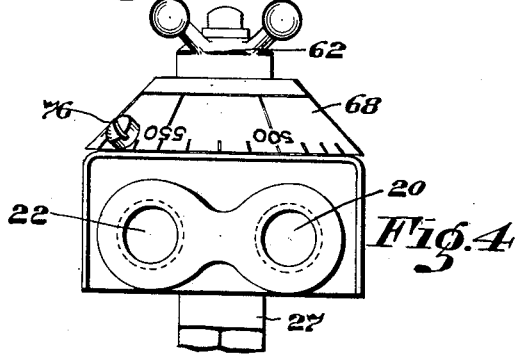

1,917,346

UNITED STATES PATENT OFFICE

ANTON M. VEDOE, OF QUINCY, AND CARL EIBYE, OF BOSTON, MASSACHUSETTS, ASSIGNORS TO VEDOE-PETERSON CO., OF NORFOLK DOWNS, MASSACHUSETTS, A COPARTNERSHIP CONSISTING OF ANTON M. VEDOE AND ERICK J. PETERSON, BOTH OF QUINCY, MASSACHUSETTS

AUTOMATIC GAS CONTROLLER FOR OVENS

Application filed December 17, 1930. Serial No. 502,957.

This invention relates to thermostatic regulators, and more especially to such regulators which are particularly adapted to automatically control the temperature of ovens by controlling the flow of gaseous fuel thereto. These regulators are most commonly used on baking ovens and we are aware that many such regulators are now known and in use. Various objections have, however, been found with these known regulators and the primary object of our invention is to provide a new and improved regulator of this type which will eliminate these objections.

The most common form of oven regulator heretofore known uses as the thermostatic controlling element or elements relatively long rods or members which not only make the device heavy and cumbersome but, when assembled within an oven, take up an objectionable amount of the oven space and are liable to become hit and cause damage. These devices have, furthermore, been able to produce only a relatively small valve movement throughout the range of temperature required, whereby the valves have not been operated most accurately and efficiently. It is a further object of our invention to produce an improved oven regulator wherein these two objections are eliminated and wherein the relatively small thermostatic element used greatly increases the valve movement of these regulators and permits the regulators to be made relatively small, of light weight, and compact.

Other difficulties heretofore experienced have included the leakage of gas, due to improper seating of the controlling valve, and it is another object of our invention to eliminate this objection by the employment of a new and improved floating valve, which is preferably a disk loosely mounted on the valve stem.

In the accompanying drawings we have illustrated certain specific embodiments of our invention but it will be understood that the invention can be otherwise embodied and that the drawings are not to be construed as defining or limiting the scope of the invention, the claims appended hereto being relied upon for that purpose.

Referring to the figures of the drawings,

Fig. 1 is a side elevation of our improved regulator mounted in operative position on an oven;

Fig. 2 is an enlarged side elevation of the regulator;

Fig. 3 is a front view thereof;

Fig. 4 is a bottom plan view;

Fig. 5 is a vertical longitudinal sectional view therethrough taken on line 5—5 of Fig. 3;

Fig. 6 is a perspective view of the valve and its controlling thermostat;

Fig. 7 is a detail view of a valve adjusting stem;

Fig. 8 is a sectional view taken on line 8—8 of Fig. 9 and showing a modified form of the device shown in Fig. 6;

Fig. 9 is a view thereof taken on line 9—9 of Fig. 8; and

Fig. 10 is a sectional view thereof taken on line 10—10 of Fig. 8.

We have, for convenience and simplicity, in the accompanying drawings and throughout the specification illustrated and described our invention in connection with baking ovens. Such an oven 10 is heated by a gas burner 12 to which fuel, ordinarily a gas, is supplied by a pipe 14. In accordance with our invention, the flow of this gas is automatically controlled by a regulator 16 and through which gas passes to the pipe 14 from a main supply pipe 18. We will now proceed to describe our improved regulator as illustrated in the accompanying drawings.

The body 16 of the regulator has gas inlet and outlet ports 20 and 22, and a valve seat 24 at the junction of these ports. Threaded openings are provided in the front and rear walls of the member 16 and means extending through these openings are respectively adapted to manually adjust the fuel controlling valve and automatically control the same in accordance with the oven temperature. A tubular housing 26 threaded into a boss 27 around the rear wall opening may be rigidly secured in place by a check nut 28 thereon. Mounted on the outer end of this housing is a second housing 30, preferably of sheet metal, and having as its outer wall a thin sheet metal disk 32, this disk being secured to the housing by crimping the edge thereof over the peripheral portion of the disk at 34.

The thermostat of our improved regulator comprises a bi-metallic plate 36, the inner portion of which has a less coefficient of expansion than does the outer portion whereby it is adapted to perform the valve operating function hereinafter described. This plate, as illustrated, is of rectangular shape, is secured at its central portion 38 to the inner face of the disk 32, and has its outer end portions 40 bent away from the disk. These two ends are connected by any convenient and suitable means, as the thin flexible plate 42 illustrated as receiving riveting portions 44 of the ends 40 therethrough. Secured to the central portion of the plate 42 and extending into the housing 26 is an internally threaded stud 46. It will be understood that the disk 32, thermostat 36, plate 42 and stud 46 are assembled together before securing the disk to the housing 30 at 34.

A valve stem 48 has an end 50 threaded into the stud 46 and its other end rotatably supported in the inner end of a bore 52 through a bushing 54 threaded into the opening in the front wall of the body 16. The valve which cooperates with the valve seat 24 comprises a disk 56 loosely mounted on the valve stem between a shoulder 58 thereon and a spring ring 60. The valve is thereby so floatingly supported that it automatically and universally seats into accurate engagement with the valve seat. The valve may be manually moved as hereinafter described, by rotating the valve stem 48, and the valve is automatically moved in both directions by longitudinal movement of the valve stem under the influence of the thermostatic plate 36. The threads 50 are of such coarse pitch that one complete turn of the valve stem will move the valve through its full range.

The valve stem may be manually rotated and thereby move the valve toward or from its seat by means of an adjusting knob 62 on the outer end of a stem 64 within the bore 52. A tongue 65 on the inner end of this stem so engages within a slot 66 in the end of the valve stem as to in no manner interfere with longitudinal movement of the valve stem by the thermostat but permit manual rotation of the valve stem by the knob 62. This manual adjustment is indicated by a conical dial 68 supported on the reduced outer portion 69 of the stem 64 and frictionally gripped between the knob 62 and a shoulder 70 on the stem. A screw 78 threaded into a bore 73 in the stem serves to clamp these parts together, it being understood that the dial may be rotatably adjusted upon loosening the screw. The dial is provided with temperature readings from 250° to 550° and an index pointer 74 mounted on the body 16 by screws 75 is provided to cooperate with these numbers, a stop 76 being also provided on the dial and engageable with the opposite sides of the pointer for limiting the rotation of the dial in opposite directions. Leakage of gas through the port 52 is prevented by a compression spring 78' acting outwardly against the dial and holding an intermediate tapered portion 80 of the stem 64 against a corresponding portion of the bore wall.

A pilot light bypass is provided around the valve by means of intersecting holes 82 and 84 drilled into the body 16. The outer end of the hole 82 is stopped by a plug 86 threaded thereinto, the inner end of which plug also serves as an adjusting valve to the bypass. The plug may be adjusted by engaging a screw driver therewith through a hole 88 in the dial.

A method of mounting the regulator on an oven is illustrated in Fig. 1. The body portion 16 thereof seats against the outer wall of the oven and the housings 26 and 30 extend through the wall into the oven. When the device is set in place, the dial 68 is regulated as follows. The screw 78 is loosened, the temperature in the oven determined, and the dial adjusted to such position that the corresponding temperature reading thereon registers with the pointer 74. Tightening of the screw 78 then secures the dial in place by binding its hub against the shoulder 70.

The operation of the device is substantially as follows. In Fig. 5 the valve is fully closed and the oven is unheated. The plug 86 is adjusted to permit the passage of just sufficient gas for the pilot light. When a baking operation is to be performed, the valve is opened by means of the knob 62 and the oven burner lighted in the usual manner. The knob is thereafter rotated to register in alignment with the pointer 74, the dial reading corresponding to the desired oven temperature, the thermostat thereupon being adapted to automatically control the valve to keep the oven at that temperature.

The disk 32 is of such relatively thin metal that the oven heat readily passes therethrough to the thermostatic plate 36. As the oven becomes heated, this plate 36 curves toward the valve in a manner moving the ends 40 toward each other. This action, as indicated in broken lines in Fig. 5, bends the connecting plate 42 outwardly and moves the valve stem in a manner bringing its valve 56 toward the valve seat, thereby automatically cutting down the supply of gas passing to the burner. It should be particularly noted that the bowing or curving movement of the thermostatic plate is greatly multiplied at the point of plate 42 to which the stud 46 is attached, thus greatly increasing the accuracy of the device and permitting the use of a relatively small thermostatic plate. Obviously, the degree of plate curvature and, therefore, the amount of valve movement, is proportional to the oven temperature. Also, as has been stated, the valve 56 is so floatingly mounted on the valve stem that it automatically seats to an accurate fit against the valve seat.

It will be understood that the construction shown in the drawings is, for illustrative purposes only and that various changes can be made within the scope of the invention without departing from the spirit thereof. We have, in Figs. 8, 9 and 10, illustrated one slightly modified form of one feature of the invention. In this modified construction, the ends 90 of the thermostatic plate 92 which is secured to the disk 94 are connected together by a pair of rigid toggle plates 96. These toggle plates are pivoted to the ends 90 of the plate 92 and their inner ends are connected to a pivot pin 91, to which the two ears 93 of the stud 95 are also connected. Bending of the plate 92 under the influence of heat will move its two ends inwardly and through the toggles 96 draw the stud 95 and its connected valve stem and valve in the valve closing direction, as will be understood.

The utility and advantages of our improved regulator are believed to be clear and obvious without further description thereof. The device is relatively small, of light weight, very compact, relatively simple and economical to manufacture, and the amount of valve movement given thereby in proportion to the range of temperature is so increased as to very greatly enhance the operating efficiency of the device. Also, the novel manner of mounting the valve and the general and specific construction of the parts are such as to render the device very superior for its intended purpose.

Having thus described our invention, what we claim as new and desire to secure by Letters Patent is:

1. An oven regulator comprising a body member having two connected gas ports extending thereinto, a valve intercepting said ports, a thermostatic plate supported by the body member, means so connecting two relatively separated portions of the plate with the valve that movement of said portions in opposite directions will respectively move the valve in opening and closing directions, and means exteriorly of the body member for adjusting the position of the valve without affecting said plate portions.

2. An oven regulator comprising a body member having two connected gas ports extending thereinto, a valve intercepting said ports, a housing supported by and extending laterally away from the member, a thermostatic plate within the housing and supported by and extending transversely of the housing remote from the member, means, including a connection extending through the housing, so connecting the plate with the valve that movement of the plate under the action of heat will move the valve in a closing direction, and means exteriorly of the body member and on the side of the valve opposite to the housing for adjusting the position of the valve without affecting the plate.

3. An oven regulator comprising a body member having two connected gas ports extending thereinto, a valve intercepting said ports, a housing supported by and extending laterally away from the member, a thermostatic plate supported by the housing remote from the member, means connecting two relatively separated portions of the plate, means extending through the housing and connecting the first-named means with the valve, changes of temperature in opposite directions being adapted to flex said plate in opposite directions and respectively open and close the valve through said connections, and manually movable means exterior of the member for adjusting the position of the valve without affecting the plate.

4. An oven regulator comprising a body member having two connected gas ports extending thereinto, a valve intercepting said ports, a housing supported by and extending laterally away from the member, a second housing including a relatively thin wall supported on the free end thereof, a thermostatic plate supported on said wall within the second housing, means extending through the first-named housing and so connecting two relatively separated portions of the plate with the valve that movement of said portions in opposite directions will respectively move the valve in opening and closing directions, and means for adjusting the position of the valve without affecting said plate portions.

5. An oven regulator comprising a body member having two connected gas ports extending thereinto, a valve intercepting said ports, a housing supported by and extending laterally away from the member, a thermostatic plate supported by the housing remote from the member, means, including a threaded valve stem extending through the housing, providing a connection to the plate, the valve being carried by the stem, changes of temperature in opposite directions being adapted to flex said plate in opposite directions and respectively open and close the valve through said connections, and manually movable means exterior of the member and so connected to the valve stem as to rotate the same but not interfere with longitudinal movement thereof under the action of the plate.

6. An oven regulator comprising a body member having two connected gas ports extending thereinto, a valve intercepting said ports, a thermostatic plate supported by the body member and having the two ends thereof bent toward the member, means connecting said ends, means so connecting the first-named means with the valve that movement of the ends toward each other and away from each other will respectively move the valve in opposite directions, and means exteriorly of the body member for adjusting the position of the valve without affecting said ends.

7. An oven regulator comprising a body member having two connected gas ports extending thereinto, a valve intercepting said ports, a housing including a relatively thin wall supported by the member, a thermostatic plate supported on said wall and having the two ends thereof bent toward the member, means connecting said ends, a stud connected to said means and extending toward the valve, a stem connected to the valve and threaded to the stud, and means exterior of the member for rotating the stem.

8. An oven regulator comprising a body member having two connected gas ports extending thereinto, a valve seat at the junction of said ports, a thermostatically controlled stem in the member, a valve loosely mounted on the stem adjacent to the seat, and a ring engaging the stem and retaining the valve loosely thereon between the ring and an abutment shoulder on the stem, the valve having free engagement with the seat whereby it is adapted to adjust freely itself to the seat when forced thereonto by the shoulder.

9. An oven regulator comprising a body member having two connected gas ports extending thereinto, a valve seat at the junction of said ports, a bi-metallic thermostatic member, a valve stem, means including screw threads connecting the stem and member, a valve on the stem adapted to engage the valve seat, a bushing threaded into the body and supporting one end of the stem, and an adjustable element extending through the bushing and having an adjusting knob on its outer end and its inner end having a rotating engagement with the stem which permits free longitudinal movement of the stem.

10. An oven regulator comprising a body member having two connected gas ports extending thereinto, a valve intercepting said ports, a housing including a relatively thin wall supported by the member, a thermostatic plate within the housing and adjacent to the wall, a threaded stud connected to the plate and extending toward the valve, a stem connected to the valve and threaded to the stud, and means exterior of the member and on the side of the valve opposite to said stem for rotating the stem.

11. An oven regulator comprising a body member having two connected gas ports extending thereinto, a valve intercepting said ports, a thermostatic plate supported by the body member and adapted to bend upon the application of heat thereto, means connecting two relatively separated portions of the plate, means connecting the valve with the first-named means intermediate its said connections to the said two portions of the plate, bending movement of the plate caused by the application of heat thereto being adapted to vary the distance between said two portions and cause closing movement of the valve, and means for adjusting the position of the valve manually without affecting said plate portions.

ANTON M. VEDOE.
CARL EIBYE.